(12) United States Patent
Chen et al.

(10) Patent No.: US 8,263,194 B2
(45) Date of Patent: Sep. 11, 2012

(54) COLOR FILTER AND METHOD OF FABRICATING THE SAME

(75) Inventors: Pin-Chen Chen, Taipei (TW); Hui-Lung Kuo, Taipei (TW); Chih-Ho Chiu, Taipei (TW); Liang-Bin Yu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 560 days.

(21) Appl. No.: 12/473,678

(22) Filed: May 28, 2009

(65) Prior Publication Data

US 2009/0231706 A1    Sep. 17, 2009

Related U.S. Application Data

(63) Continuation-in-part of application No. 11/176,261, filed on Jul. 8, 2005, now abandoned.

(30) Foreign Application Priority Data

Dec. 30, 2004  (TW) ................ 93141344 A

(51) Int. Cl.
*C09K 19/00* (2006.01)
(52) U.S. Cl. ............. 428/1.31; 359/491.01; 359/485.05; 349/106; 427/162; 427/164; 427/165
(58) Field of Classification Search ............... 428/1.1, 428/1.3, 1.31; 349/97, 106; 359/485.05, 359/487.03, 503, 568, 585, 491.01; 427/162, 427/164, 165
See application file for complete search history.

(56) References Cited

U.S. PATENT DOCUMENTS

| | | | |
|---|---|---|---|
| 4,252,891 A | 2/1981 | Kostyshin et al. | |
| 4,506,949 A | 3/1985 | Knop | |
| 5,119,231 A | 6/1992 | Nelson et al. | |
| 5,993,950 A | 11/1999 | Novis et al. | |
| 6,097,456 A | 8/2000 | Wang | |
| 6,262,830 B1 | 7/2001 | Scalora | |
| 6,798,464 B2 | 9/2004 | Bietsch et al. | |
| 7,158,302 B2 | 1/2007 | Chiu et al. | |
| 2001/0006406 A1 | 7/2001 | Nakasima | |
| 2002/0003661 A1 | 1/2002 | Nakai | |
| 2002/0167619 A1* | 11/2002 | Bietsch et al. | ...... 349/1 |
| 2002/0191880 A1 | 12/2002 | Borrelli et al. | |
| 2003/0156325 A1 | 8/2003 | Hoshi | |

OTHER PUBLICATIONS

Yu et al., "Reflective polarizer based on a stacked double-layer subwavelength metal grating structure fabricated using nanoimprint lithography", Applied Physics Letters, vol. 77, No. 7, pp. 927-929, Aug. 14, 2000.

* cited by examiner

*Primary Examiner* — Angela Ortiz
*Assistant Examiner* — Ruiyun Zhang
(74) *Attorney, Agent, or Firm* — Birch, Stewart, Kolasch & Birch, LLP

(57) ABSTRACT

A color filter having a bi-layer metal grating is formed by nanoimprint lithography. Nanoimprint lithography, a low cost technology, includes two alternatives, i.e., hot-embossing nanoimprint lithography and UV-curable nanoimprint lithography. Manufacture steps includes providing a substrate with a polymer material layer disposed thereon. A plurality of lands and grooves are formed in the polymer material layer, and a first metal layer and a second metal layer are disposed on the surfaces of the lands and grooves, respectively. Finally, a color filter having a bi-layer metal grating is obtained.

28 Claims, 22 Drawing Sheets

COLOR FILTER AND METHOD OF FABRICATING THE SAME

CROSS REFERENCE TO RELATED APPLICATIONS

This application is a Continuation-In-Part of U.S. patent application Ser. No. 11/176,261, filed Jul. 8, 2005 now abandoned and entitled "COLOR FILTER AND METHOD OF FABRICATING THE SAME".

This Application claims priority of Taiwan Patent Application No. 93141344, filed on Dec. 30, 2004, the entirety of which is incorporated by reference herein.

BACKGROUND

The present invention relates to a color filter and method of fabricating the same, and more particularly to a color filter having a bi-layer metal grating.

Color filter, a main component in an LCD device, converts white light to red, green, and blue light. Methods of fabrication comprise dyeing, printing, electrodeposition, or pigment dispersal. Pigment dispersal and dyeing methods are both popularly used.

FIG. 1 shows a pigment dispersed method, comprising coating of photoresist, pre-baking, exposure, development, and post-baking. A color array, including red, green, and blue films, is formed by repeating the steps three times. The red, green, and blue films have different thicknesses to achieve agreement of light intensity. In addition to being complex and low yield, the method is also limited by low color saturation, non-uniform thickness.

As well, Dyeing offers only low resistant to heat and chemicals. Nether method significantly improves color purity.

For a color filter, optical properties, compatibility with subsequent process, and reliability are all priorities, with optical properties such as transmission and color saturation being most important.

High transmission requires less intensity from backlight, thereby saving power. Red, green, and blue transmittance percentages are required to approach 85%, 75%, and 75%, respectively.

High color saturation can be achieved by coupling a color filter with a backlight. The backlight may be a cold cathode fluorescent lamp. FIG. 2 is a chart showing the transmission spectrum for a cold cathode fluorescent lamp. However, as shown in FIG. 2, there are two undesired transmission peaks at 490 nm and 580 nm, resulting in a significant loss of color saturation. In addition, a conventional color filter, as shown in FIG. 3, can't effectively eliminate the described transmitted light.

Accordingly, a simplified method for fabricating a color filter capable of enhancing color saturation is required.

SUMMARY

A method of fabricating a sub-wavelength structure was proposed by chou et al. in 1999, utilizing thermal nanoimprint lithography. In addition, a method of fabricating a nanostructure has been proposed by Molecular Imprints, Inc. using step and flash imprint lithography.

An embodiment of a method of fabricating a color filter comprises photoresist layers having different thicknesses being formed on a substrate. The substrate is glass or plastic and the photoresist comprises photosensitive polymer material or polymethyl methacrylate (PMMA).

A mask or mold having suitable period, depth, and aspect ratio is used in hot-embossing nanoimprint lithography or UV-curable nanoimprint lithography, transferring the pattern to the photoresist layers.

Metal layers are disposed on the photoresist layers by sputtering or vacuum deposition, thereby a bi-layer metal grating with a desired spacing between the metal layers is obtained. The photoresist's index of refraction exceeds that of the metal layers, reducing reflected light.

In addition, optical properties of the color filter of the embodiment are simulated by a commercial application, the Gsolver Diffraction Grating Analysis Program, based on RCWA (rigorous coupled wave analysis), a commercial application developed by Grating Solver Development Company.

The color filter of the embodiment, having a bi-layer metal grating, provides 10 nm spacing between the metal layers, a grating period of 100 to 400 nm, and a thickness of metal layers from 30 to 200 nm. By altering the spacing between the metal layers, grating period, and thickness of metal layers, the problems disclosed can be solved and transmission enhanced up to 85%.

The bi-layer metal grating of the embodiment has a total thickness of less than 500 nm and difference in metal layers is less than 100 nm. In addition to simplified process the bi-layer metal grating provides smooth surfaces to reduce scattering, with increased brightness.

The color filter coupled to a polarizer can be used to generate polarized light and display a color image. The polarizer may be disposed on any side of the substrate.

The color filter of the embodiment may be applied to reflective, projective, or organic light emitting display devices.

A detailed description is given in the following embodiments with reference to the accompanying drawings.

DESCRIPTION OF THE DRAWINGS

A color filter and method of fabricating the same will become more fully understood from the detailed description given herein below and the accompanying drawings, given by way of illustration only and thus not intended to be limitative of the invention.

DETAILED DESCRIPTION

FIGS. 4 to 13 show embodiments of a method of fabricating a color filter using hot-embossing nanoimprint lithography.

FIGS. 14A to 14G show an embodiment of a method of fabricating a color filter using UV-curable nanoimprint lithography.

Figure 1:
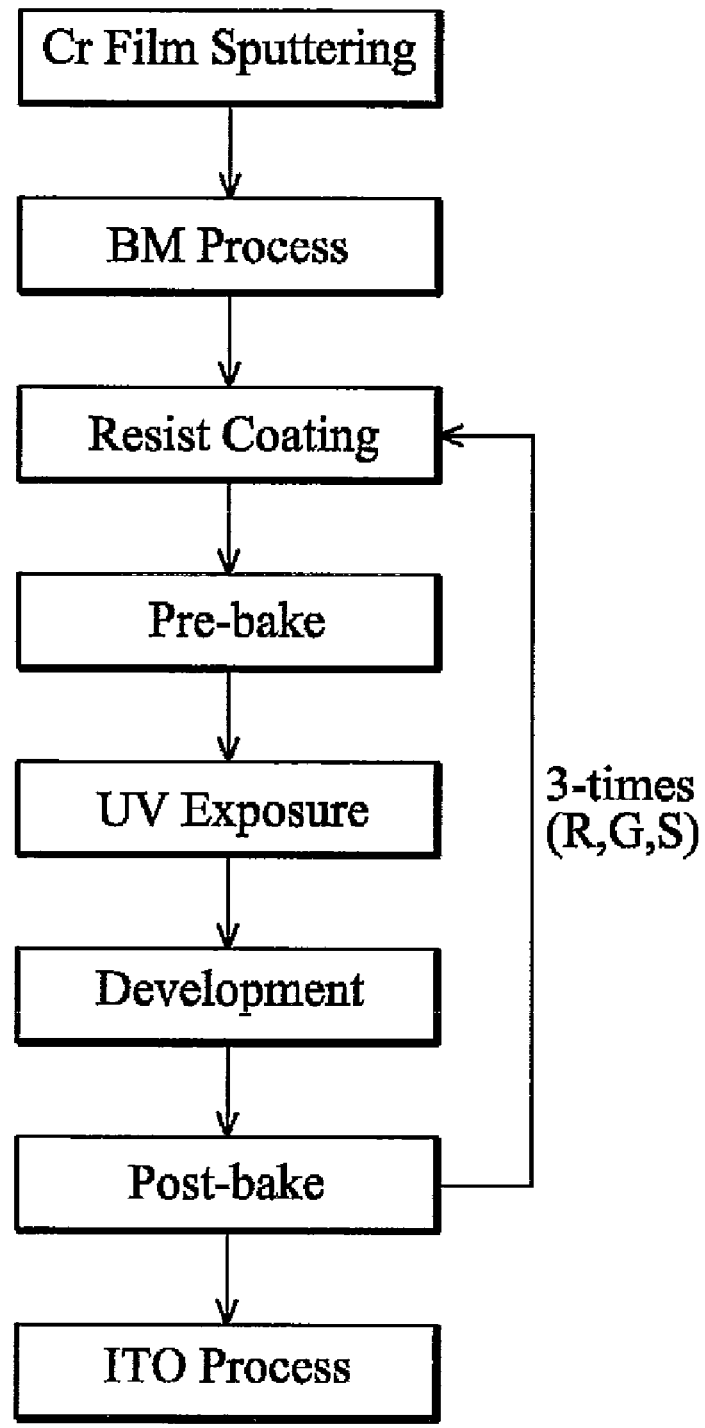
FIG. 1 is a flowchart of a conventional method for fabricating a color filter.
Figure 2:
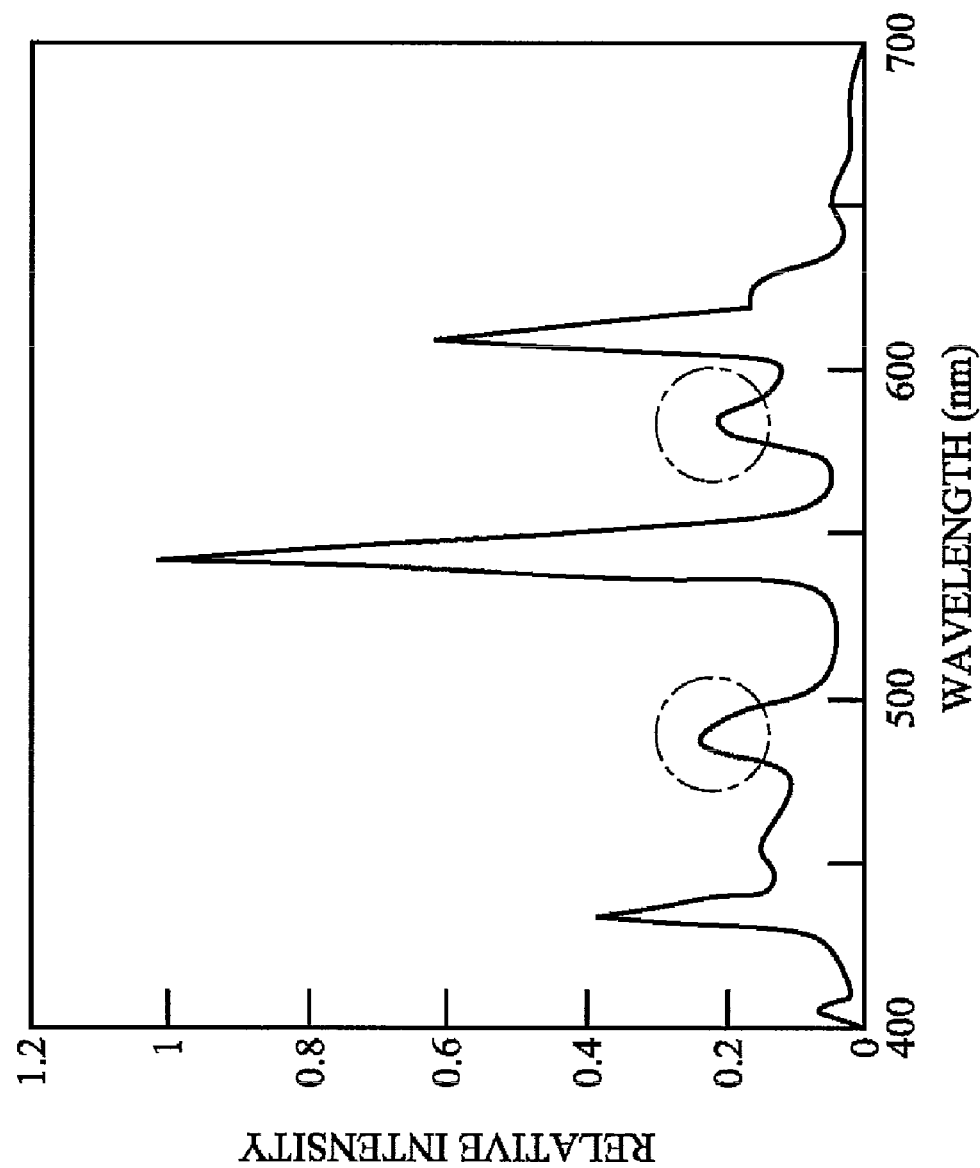
FIG. 2 is a chart showing the transmission spectrum of a cold cathode fluorescent lamp.
Figure 3:
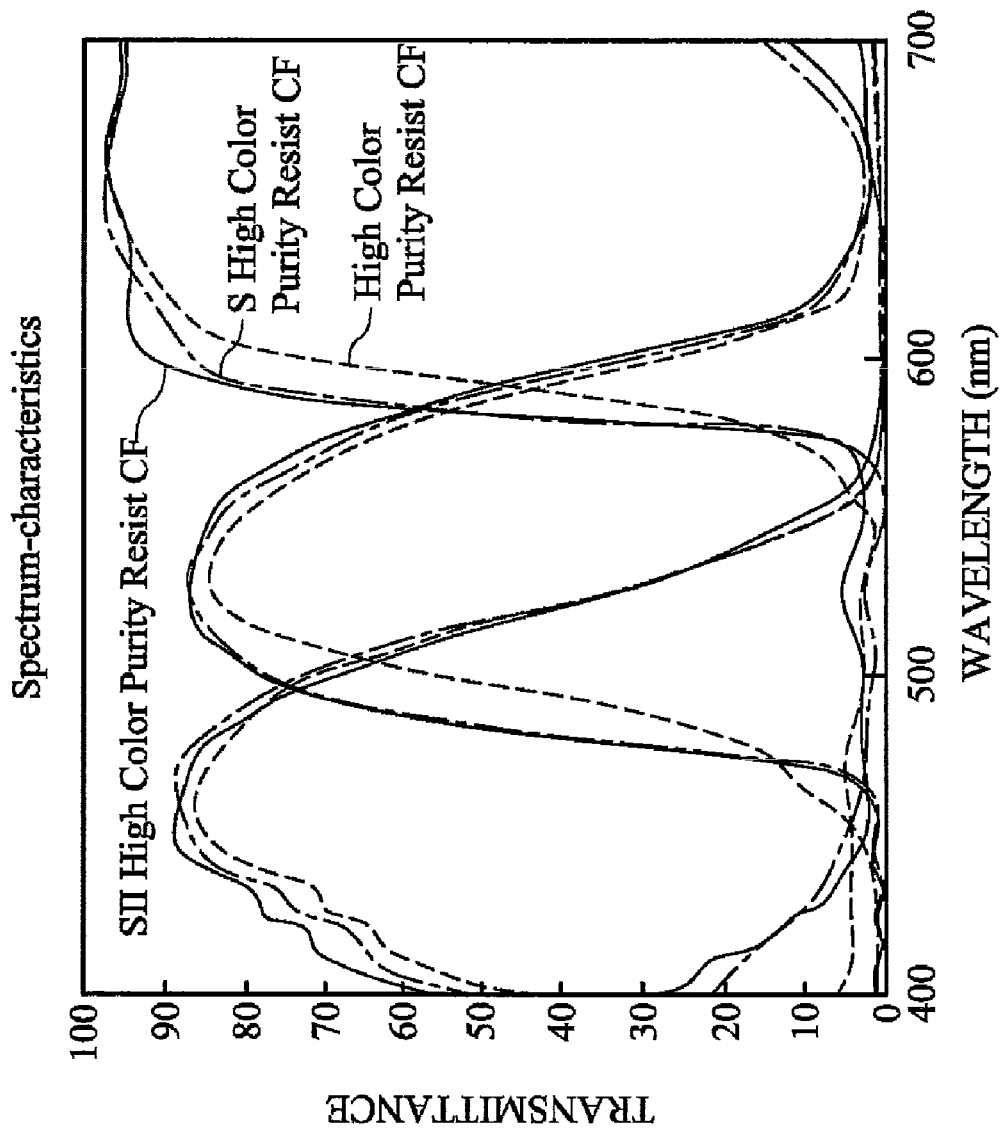
FIG. 3 is a chart showing the transmission spectrum of a conventional color filter.
Figure 4A:
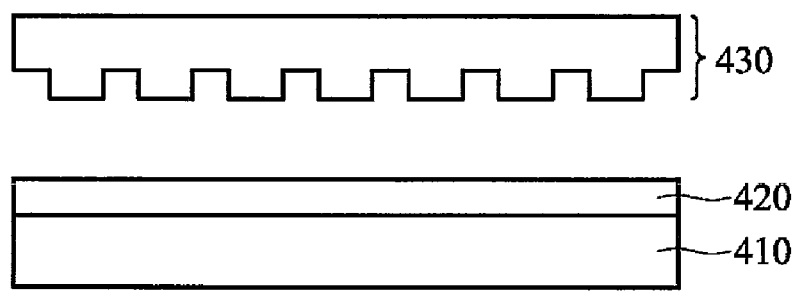
FIGS. 4A to 4G are cross-sections of an embodiment of a method for fabricating a color filter.

In FIG. 4A, a substrate 410, such as a glass substrate, with a polymer layer 420 formed thereon is provided. The polymer layer 420 may be polymethyl methacrylate (PMMA).

Figure 4B:
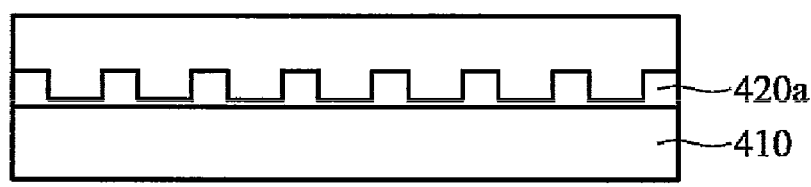

In FIGS. 4A to 4B, a mold 430 having a pattern of microstructure is pressed into the polymer layer 420 and the polymer layer 420 is heated above a glass transition temperature thereof, thereby transferring the pattern to the polymer layer 420.

Figure 4C:
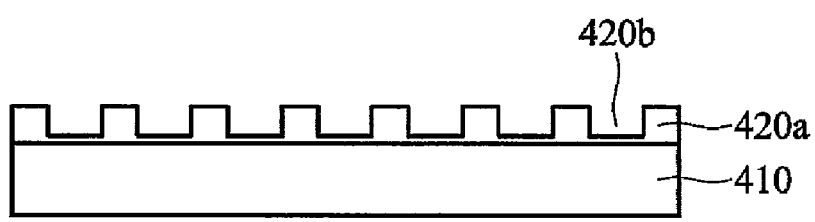

After removal of the mold 430, a plurality of lands 420a and grooves 420b are formed in the polymer layer 420, as shown in FIG. 4C.

Figure 4D:
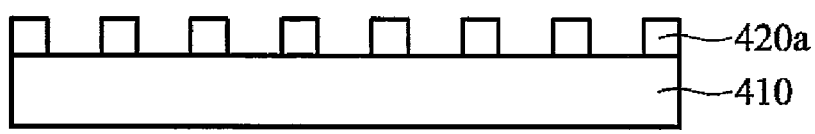

In FIG. 4D, reactive ion etching removes residual portions of the polymer layer 420 from the bottom of the grooves 420b, thereby exposing surfaces of the substrate 410.

Figure 4E:
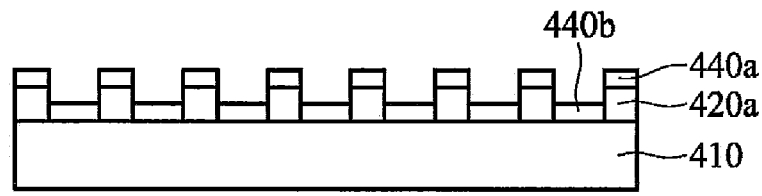

In FIG. 4E, a first metal layer 440a and second metal layer 440b are concurrently formed on the lands 420a and grooves 420b, respectively, using sputtering or vacuum deposition. The first metal layer 440a and second metal layer 440b may be gold (Au).

Figure 4F:
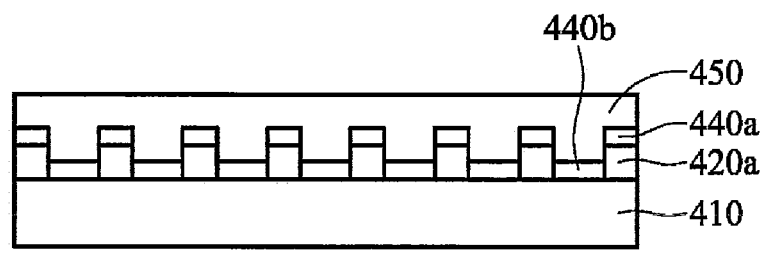

In FIG. 4F, a dielectric layer 450 is formed on the first metal layer 440a and second metal layer 440b.

Figure 4G:
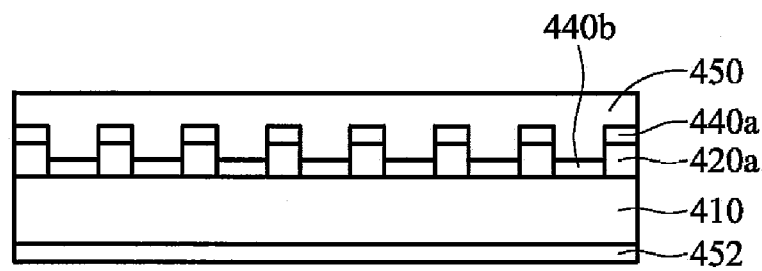
Figure 4H:
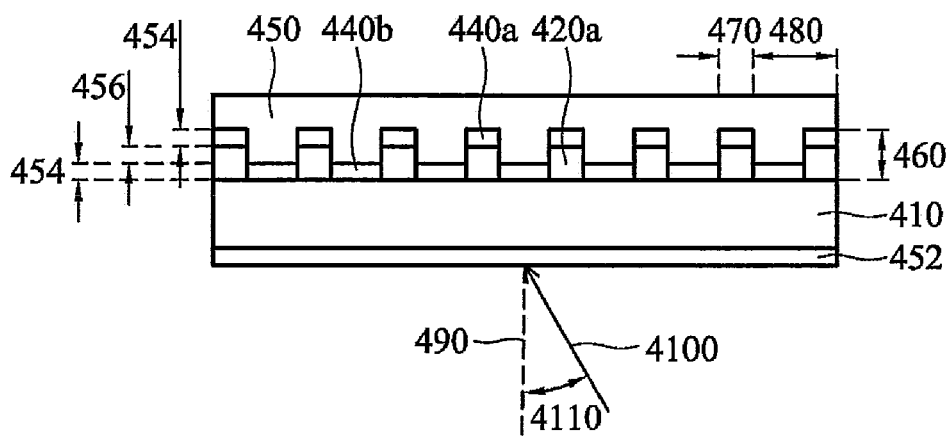
FIG. 4H is a cross-section of an embodiment of a color filter.

In FIG. 4G, a polarizer 452 is disposed under the substrate 410.

Figure 5A:
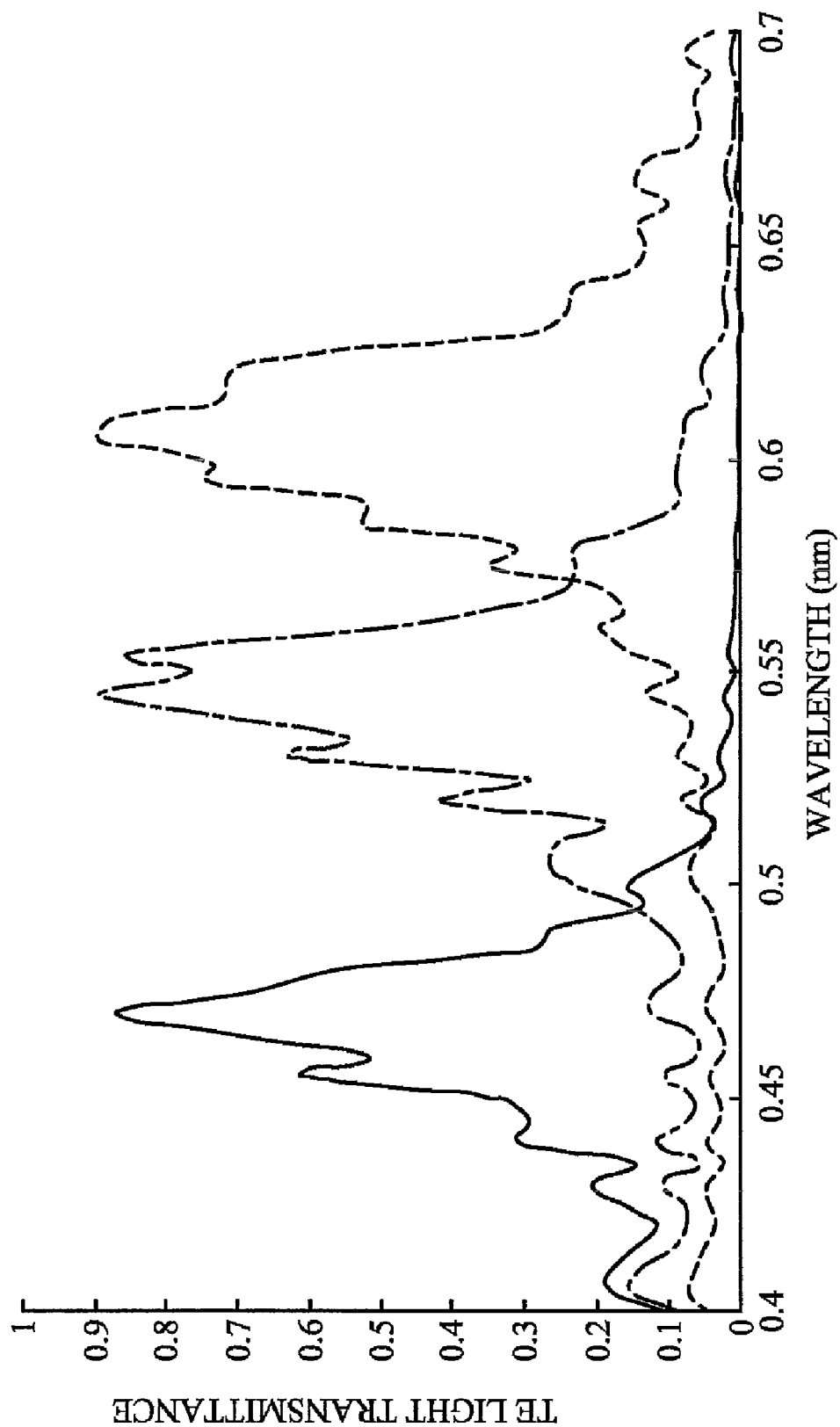
FIG. 5A is a chart showing the TE light transmission spectrum of a color filter.
Figure 5B:
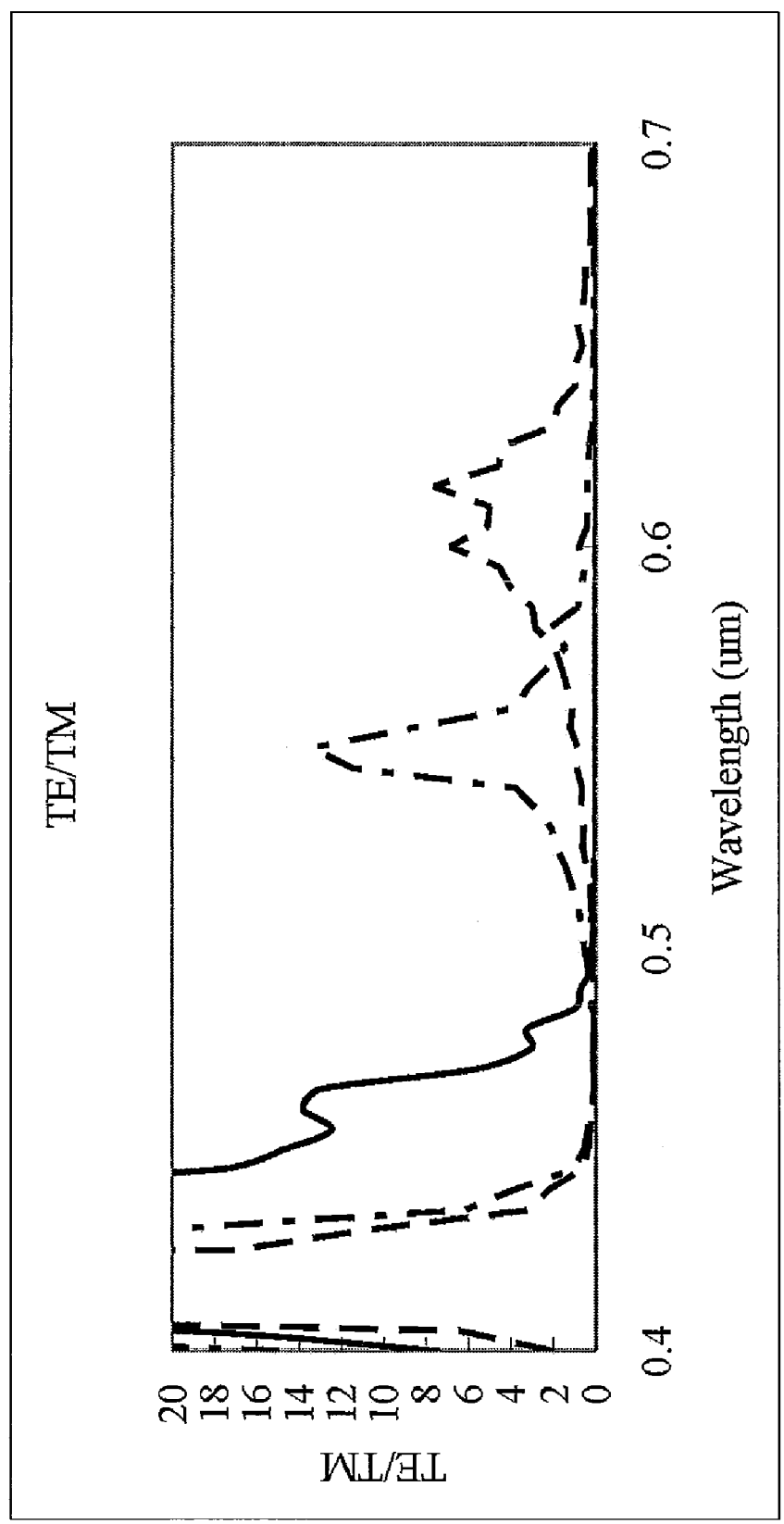
FIG. 5B is a chart showing the TE/TM contrast for a color filter.

In addition, optical properties of the color filter of the embodiment are simulated by a commercial application called Gsolver. FIG. 5A is a chart showing the TE light transmission spectrum for the color filter shown in FIG. 4H with an exemplary incident light 4100. FIG. 5B is a chart showing the TE/TM contrast for the color filter shown in FIG. 4H with an exemplary incident light 4100. The incident light 4100 has a wavelength between 400 and 700 nm, and an incident angle 4110 between the direction of the incident light 4100 and the normal direction 490 of the substrate 410. The substrate 410 has a thickness of 1000 micrometers. One land 420a and one groove 420b have a total width 480 of 250 nm. The lands 420a have a uniform width 470 of 100 nm. The first metal layer 440a and second metal layer 440b have a uniform thickness 454, comprising 90, 70, or 65 nm. The first metal layer 440a has a relative height 456 exceeding that of the second metal layer 440b, of 100, 135, or 160 nm.

As shown in FIG. 5A, the TE light (polarized light) transmission peaks occur at 470 (blue), 550 (green), and 610 nm (red), respectively, and each color light has a TE light transmission over 80%. As shown in FIG. 5B, each color light (R, G, B) has TE/TM contrast over 3. Therefore, the color filter of the embodiment not only presents high TE light transmission, but also presents good enough TE/TM contrast.

In this embodiment, the color filter provides significantly improved light filtering, thereby increasing the purity of light.

Figure 6A:
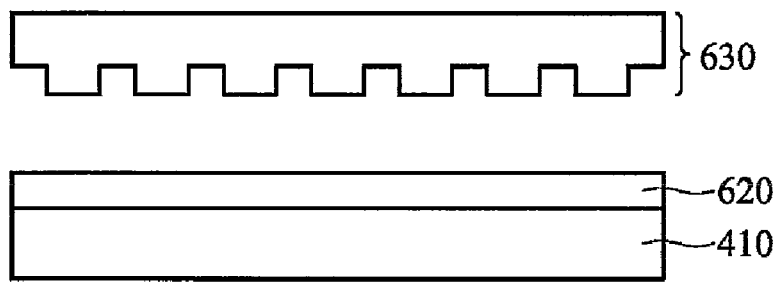
FIGS. 6A to 6G are cross-sections of an embodiment of a method for fabricating a color filter.

In FIG. 6A, a substrate 610, such as a glass substrate, with a polymer layer 620 formed thereon is provided. The polymer layer 620 may be polymethyl methacrylate (PMMA).

Figure 6B:
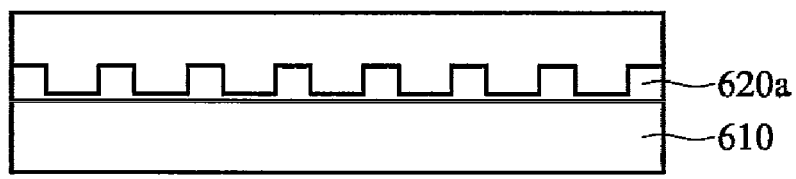

In FIGS. 6A to 6B, a mold 630 having a pattern of microstructure is pressed into the polymer layer 620 and the polymer layer 620 is heated above a glass transition temperature thereof, thereby transferring the pattern to the polymer layer 620.

Figure 6C:
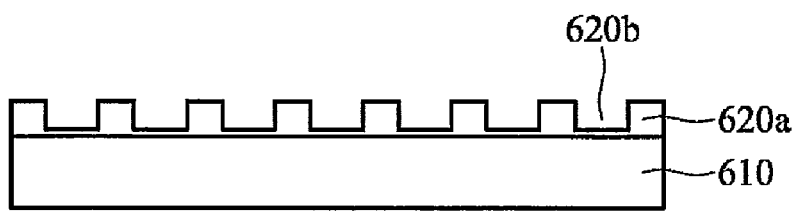

After removal of the mold 630, a plurality of lands 620a and grooves 620b are formed in the polymer layer 620, as shown in FIG. 6C.

Figure 6D:

In FIG. 6D, reactive ion etching removes residual portions of the polymer layer 620 from the bottom of the grooves 620b, thereby exposing surfaces of the substrate 610.

Figure 6E:
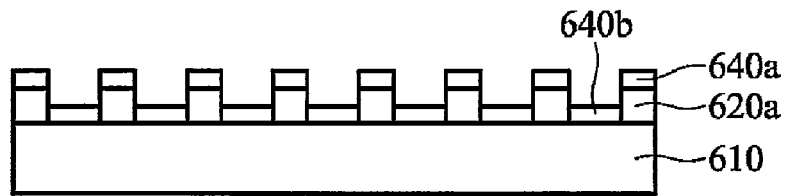

In FIG. 6E, a first metal layer 640a and second metal layer 640b are concurrently formed on the lands 620a and grooves 620b, respectively, using sputtering or vacuum deposition. The first metal layer 640a and second metal layer 640b may be aluminum (Al).

Figure 6F:
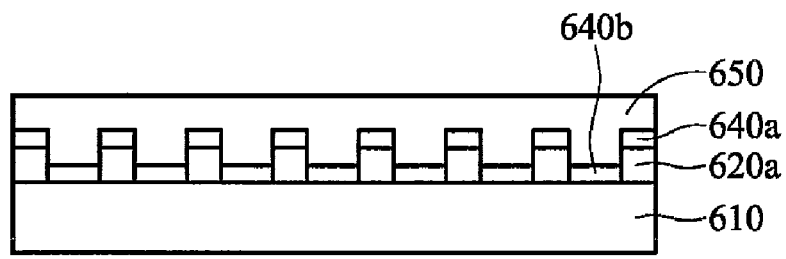

In FIG. 6F, a dielectric layer 650 is formed on the first metal layer 640a and second metal layer 640b.

Figure 6G:
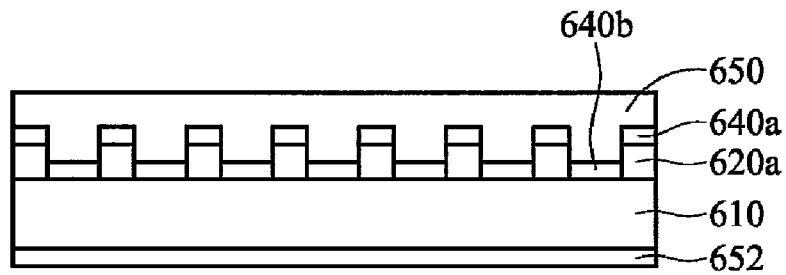
Figure 6H:
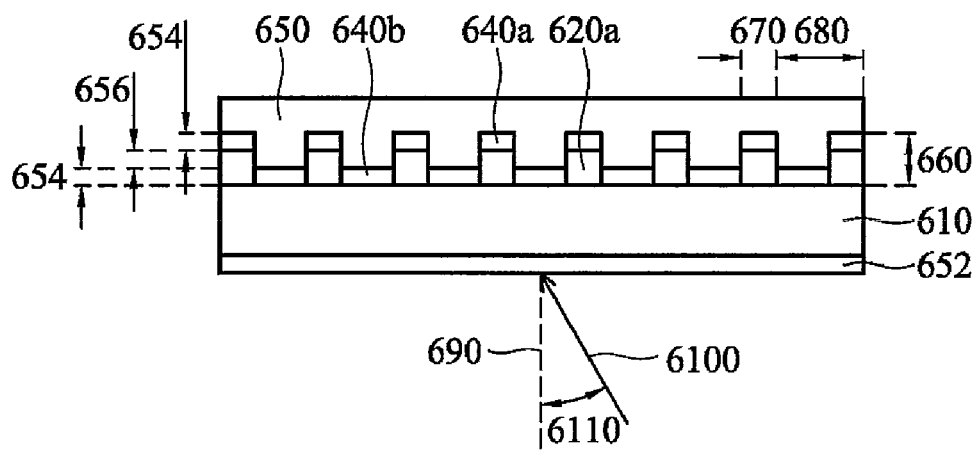
FIG. 6H is a cross-section of an embodiment of a color filter.

In FIG. 6G, a polarizer 652 is disposed under the substrate 610.

Figure 7A:
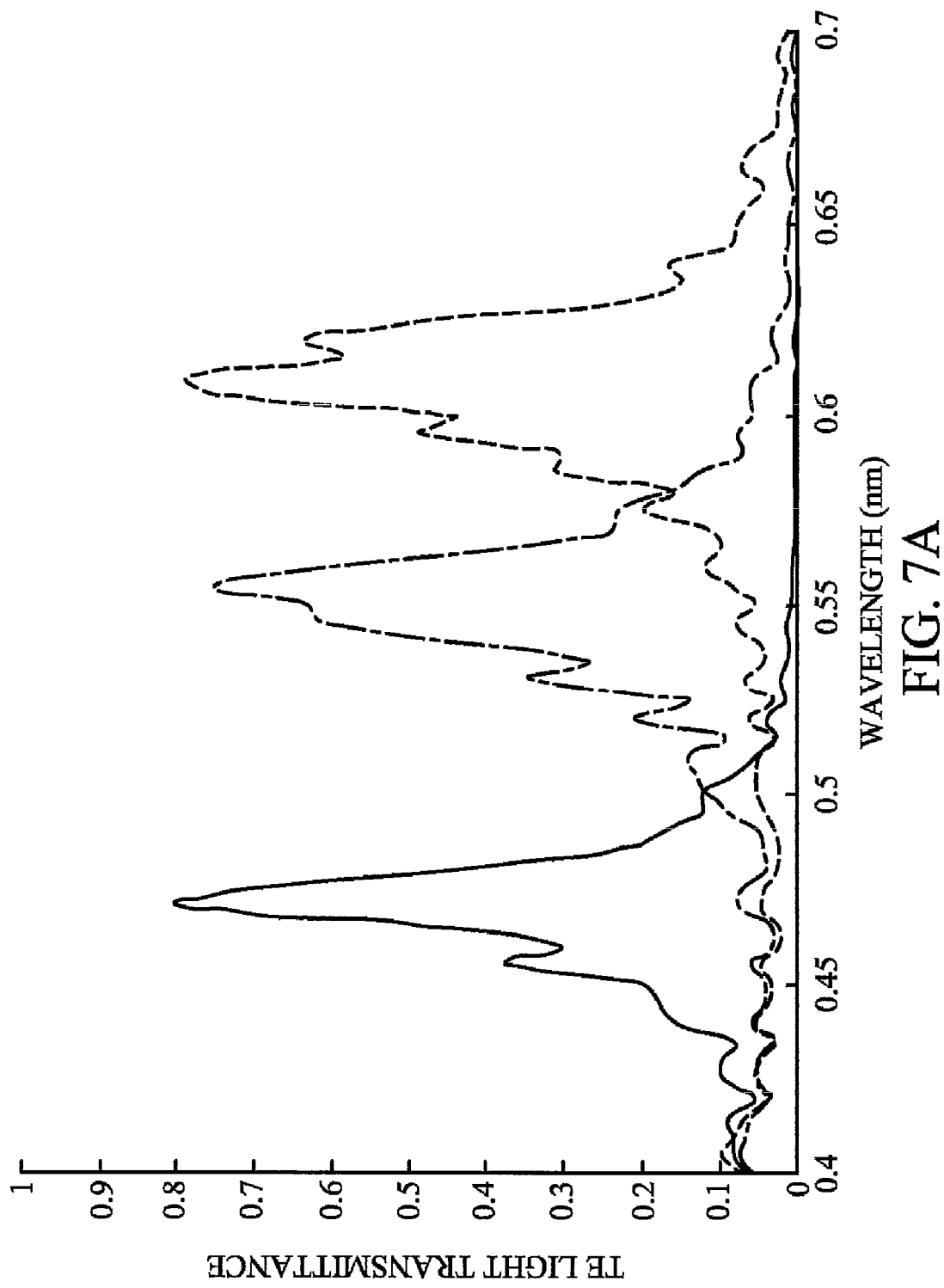
FIG. 7A is a chart showing the TE light transmission spectrum of a color filter.
Figure 7B:
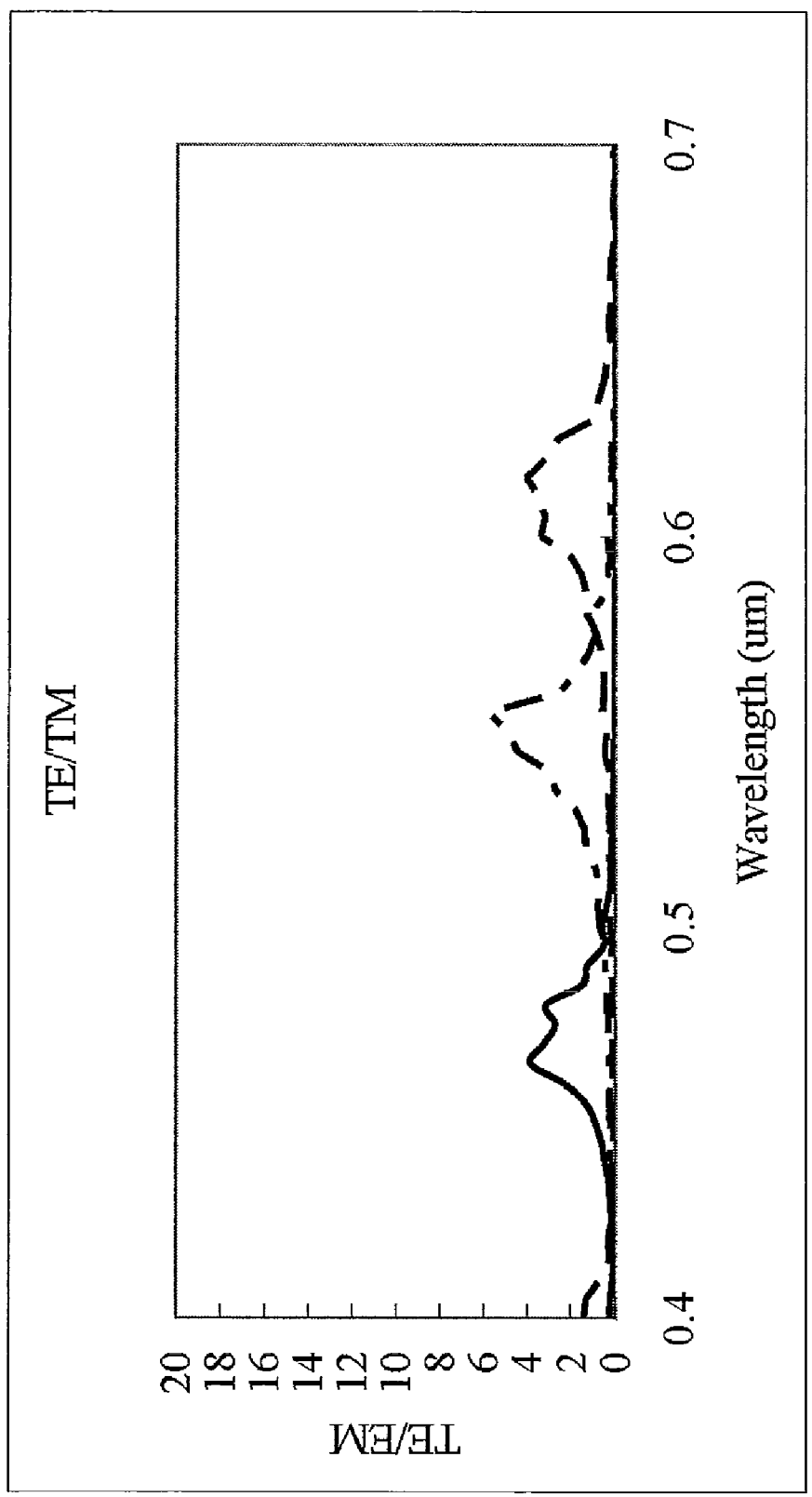
FIG. 7B is a chart showing the TE/TM contrast for a color filter.

In addition, optical properties of the color filter of the embodiment are simulated by a commercial application called Gsolver. FIG. 7A is a chart showing the transmission spectrum for the color filter shown in FIG. 6H with an exemplary incident light 6100. FIG. 7B is a chart showing the TE/TM contrast for the color filter shown in FIG. 6H with an exemplary incident light 6100. The incident light 6100 has a wavelength between 400 and 700 nm, and an incident angle 6110 between the direction of the incident light 6100 and the normal direction 690 of the substrate 610. The substrate 610 has a thickness of 1000 micrometers. One land 620a and one groove 620b have a total width 680 of 250 nm. The lands 620a have a uniform width 670 of 100 nm. The first metal layer 640a and second metal layer 640b have a uniform thickness 654, of 60, 45, or 40 nm. The first metal layer 640a has a relative height 656 exceeding that of the second metal layer 640b, and the relative height 656 may be 125, 160, or 184 nm.

As shown in FIG. 7A, TE light transmission peaks occur at 470 (blue), 550 (green), and 610 nm (red), respectively, and each color light has a TE light transmission over 70%. As shown in FIG. 7B, each color light (R, G, B) has TE/TM contrast over 3. Therefore, the color filter of the embodiment not only presents high TE light transmission, but also presents good enough TE/TM contrast.

In this embodiment, the metal layers are Al. The color filter performs better in filtering light and producing high color purity light while the TE light transmission is only about 80%.

Figure 8A:
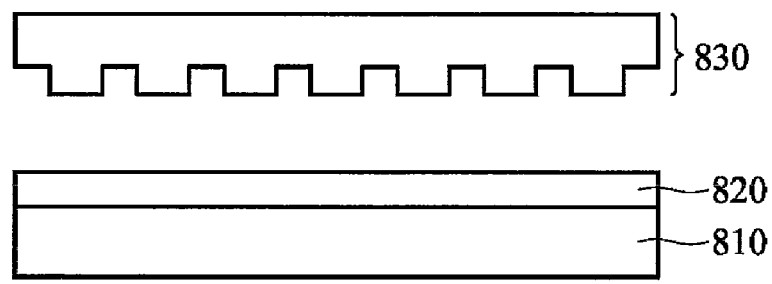
FIGS. 8A to 8G are cross-sections of an embodiment of a method for fabricating a color filter.

In FIG. 8A, a substrate 810, such as a glass substrate, with a polymer layer 820 formed thereon is provided. The polymer layer 820 may be polymethyl methacrylate (PMMA).

Figure 8B:
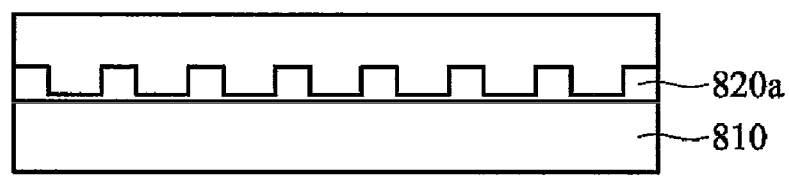

In FIGS. 8A to 8B, a mold 830 having a pattern of microstructure is pressed into the polymer layer 820 and the polymer layer 820 is heated above a glass transition temperature thereof, thereby transferring the pattern to the polymer layer 820.

Figure 8C:
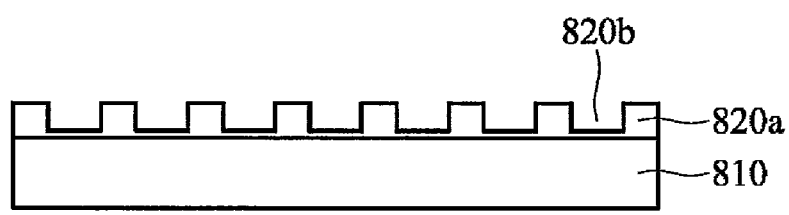

After removal of the mold 830, a plurality of lands 820a and grooves 820b are formed in the polymer layer 820, as shown in FIG. 8C.

Figure 8D:
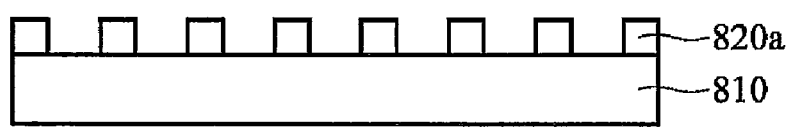

In FIG. 8D, reactive ion etching removes residual portions of the polymer layer 820 from the bottom of the grooves 820b, thereby exposing surfaces of the substrate 810.

Figure 8E:
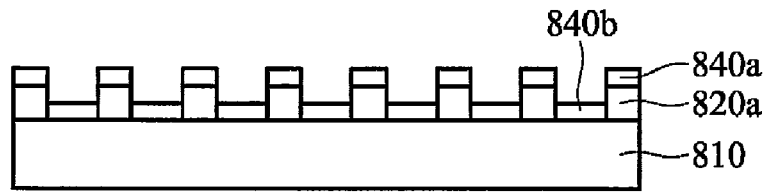

In FIG. 8E, a first metal layer 840a and second metal layer 840b are concurrently formed on the lands 820a and grooves 820b, respectively, using sputtering or vacuum deposition. The first metal layer 840a and second metal layer 840b may be silver (Ag).

Figure 8F:
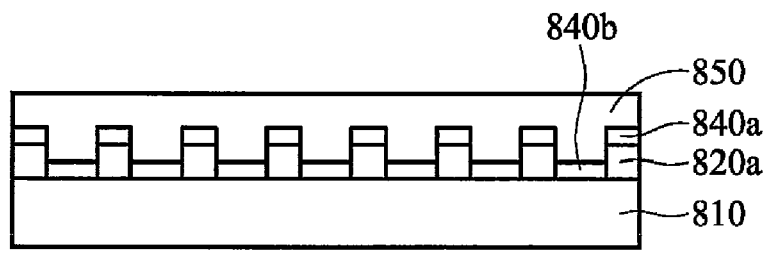

In FIG. 8F, a dielectric layer 850 is formed on the first metal layer 840a and second metal layer 840b.

Figure 8G:
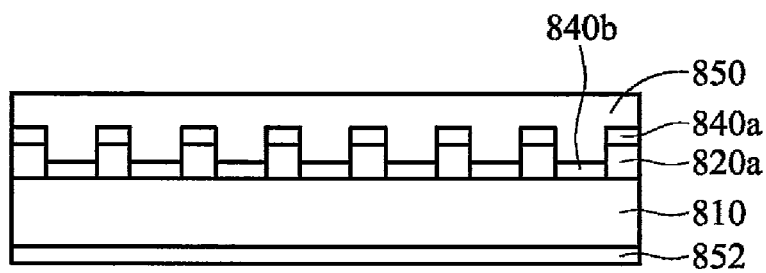
Figure 8H:
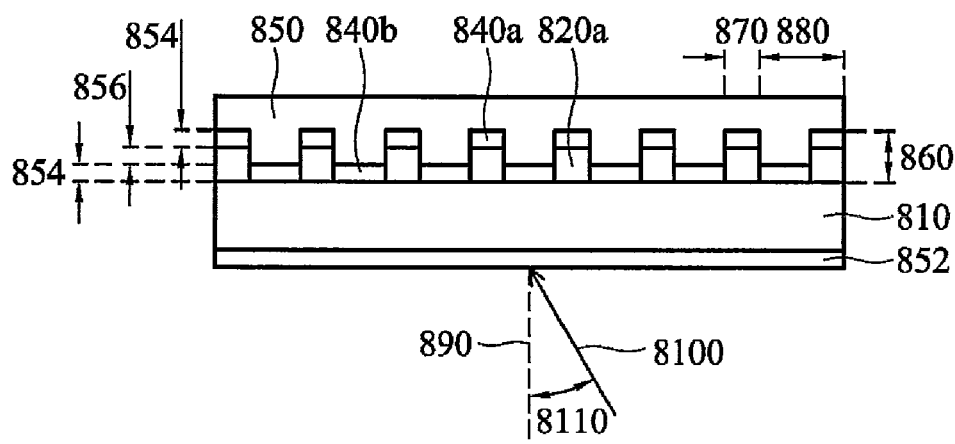
FIG. 8H is a cross-section of an embodiment of a color filter.

In FIG. 8G, a polarizer 852 is disposed under the substrate 810.

Figure 9:
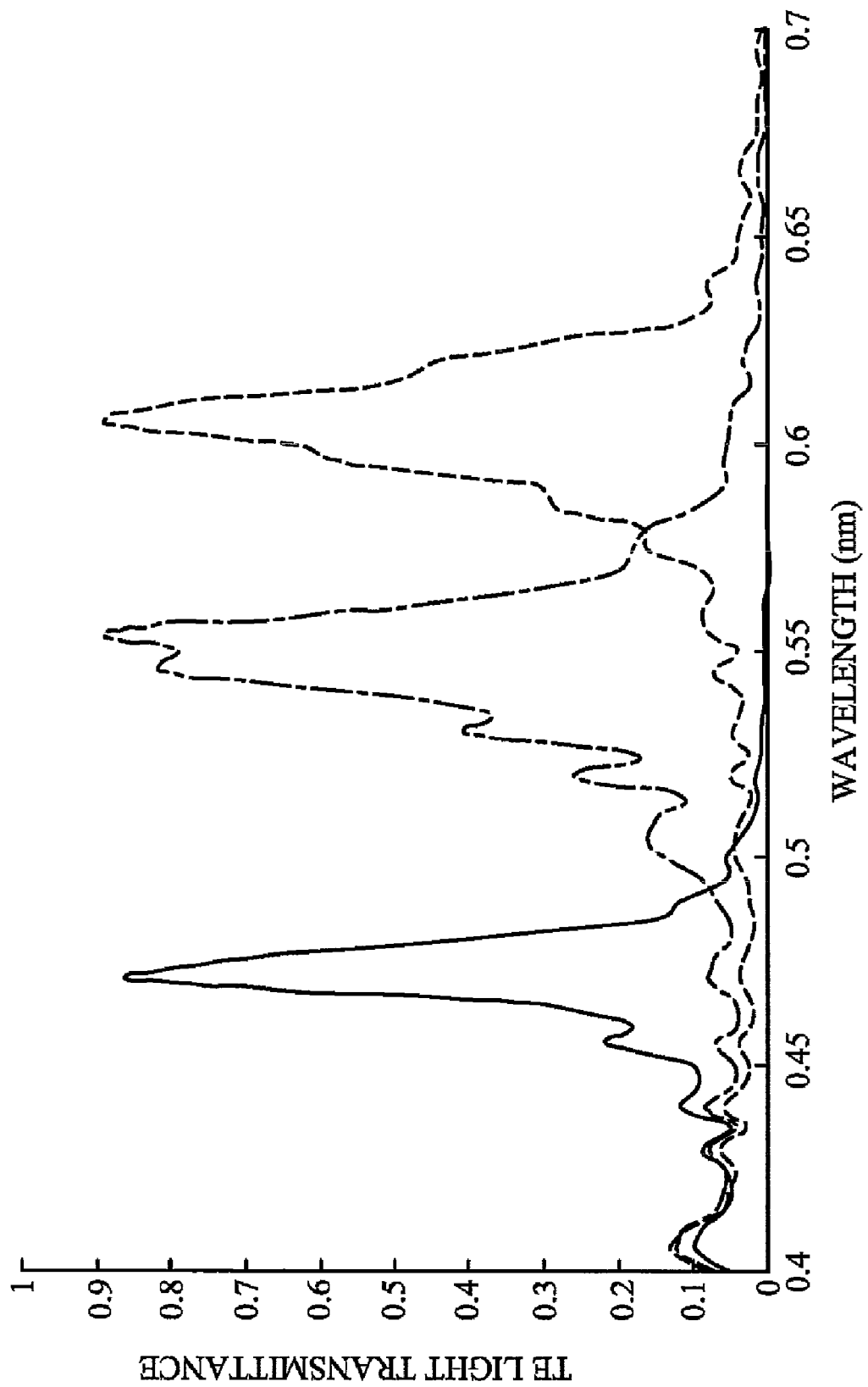
FIG. 9 is a chart showing the TE light transmission spectrum of a color filter.

In addition, optical properties of the color filter of the embodiment are simulated by a commercial application called Gsolver. FIG. 9 is a chart showing the TE light transmission spectrum for the color filter shown in FIG. 8H with an exemplary incident light 8100. The incident light 8100 has a wavelength between 400 and 700 nm, and an incident angle 8110 between the direction of the incident light 8100 and the normal direction 890 of the substrate 810. The substrate 810 has a thickness of 1000 micrometers. One land 820a and one groove 820b have a total width 880 of 250 nm. The lands 820a have a uniform width 870 of 100 nm. The first metal layer 840a and second metal layer 840b have a uniform thickness 854, of 120, 80, or 80 nm. The first metal layer 840a has a relative height 856 exceeding that of the second metal layer 840b, of 100, 136, or 160 nm.

As shown in FIG. 9, the TE light transmission peaks occur at 470 (blue), 550 (green), 610 nm (red), respectively.

In this embodiment, the metal layers are Ag. The color filter not only performs better in filtering light but also produces high color purity light. Additionally, each color light has a TE light transmission over 85%.

Figure 10A:
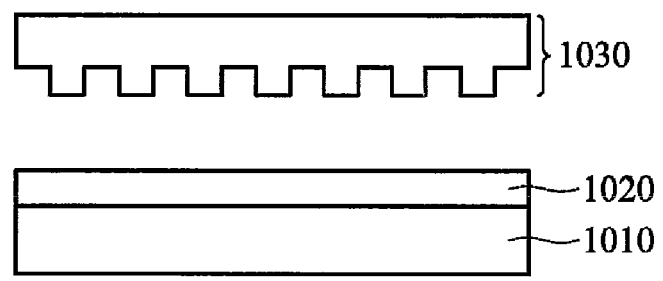
FIGS. 10A to 10G are cross-sections of an embodiment of a method for fabricating a color filter.

In FIG. 10A, a substrate 1010, such as a glass substrate, with a polymer layer 1020 formed thereon is provided. The polymer layer 1020 may be polymethyl methacrylate (PMMA).

Figure 10B:
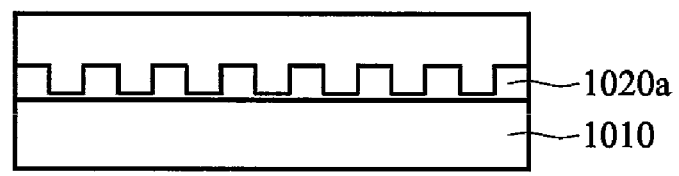

In FIGS. 10A to 10B, a mold 1030 having a pattern of microstructure is pressed into the polymer layer 1020 and the polymer layer 1020 is heated above a glass transition temperature thereof, thereby transferring the pattern to the polymer layer 1020.

Figure 10C:
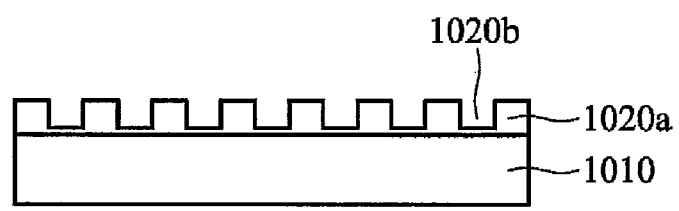

After removal of the mold 1030, a plurality of lands 1020a and grooves 1020b are formed in the polymer layer 1020, as shown in FIG. 10C.

Figure 10D:
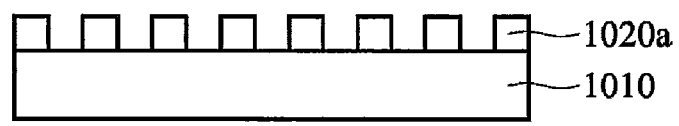

In FIG. 10D, reactive ion etching removes residual portions of the polymer layer 1020 from the bottom of the grooves 1020b, thereby exposing surfaces of the substrate 1010.

Figure 10E:
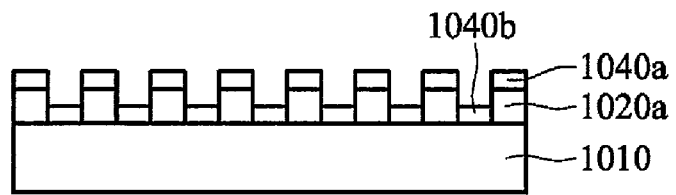

In FIG. 10E, a first metal layer 1040a and second metal layer 1040b are concurrently formed on the lands 1020a and grooves 1020b, respectively, using sputtering or vacuum deposition. The first metal layer 1040a and second metal layer 1040b may be silver (Ag).

Figure 10F:
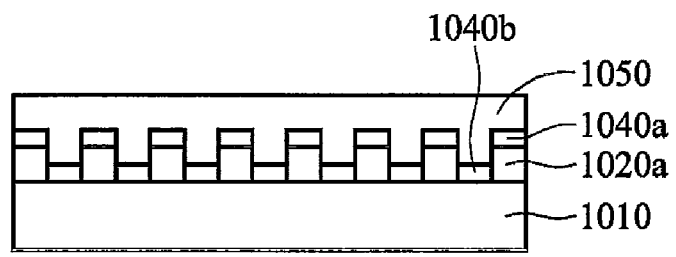

In FIG. 10F, a dielectric layer 1050 is formed on the first metal layer 1040a and second metal layer 1040b.

Figure 10G:
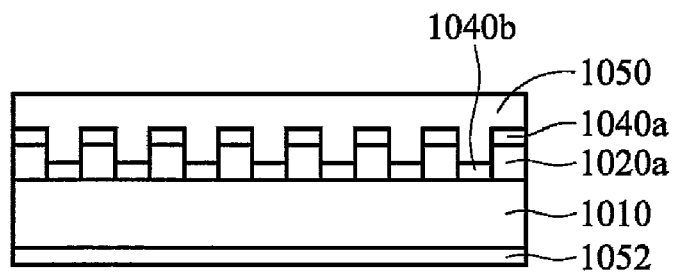
Figure 10H:
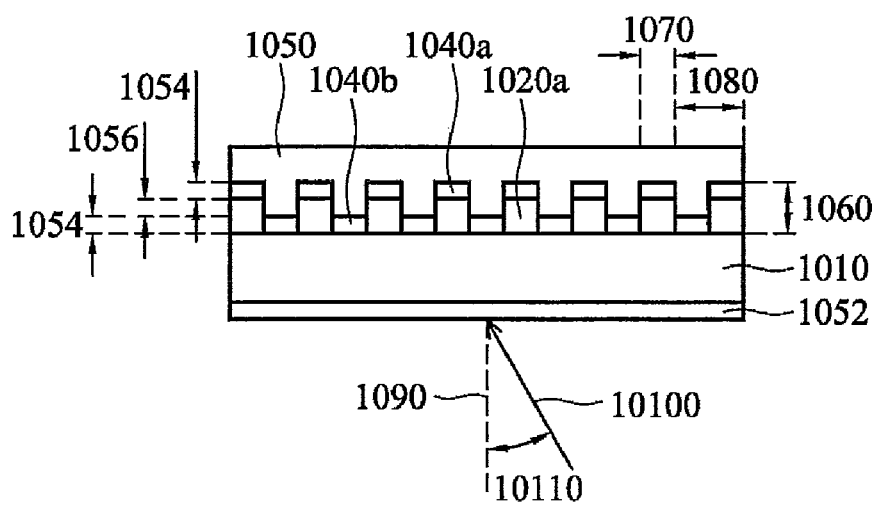
FIG. 10H is a cross-section of an embodiment of a color filter.

In FIG. 10G, a polarizer 1052 is disposed under the substrate 1010.

Figure 11:
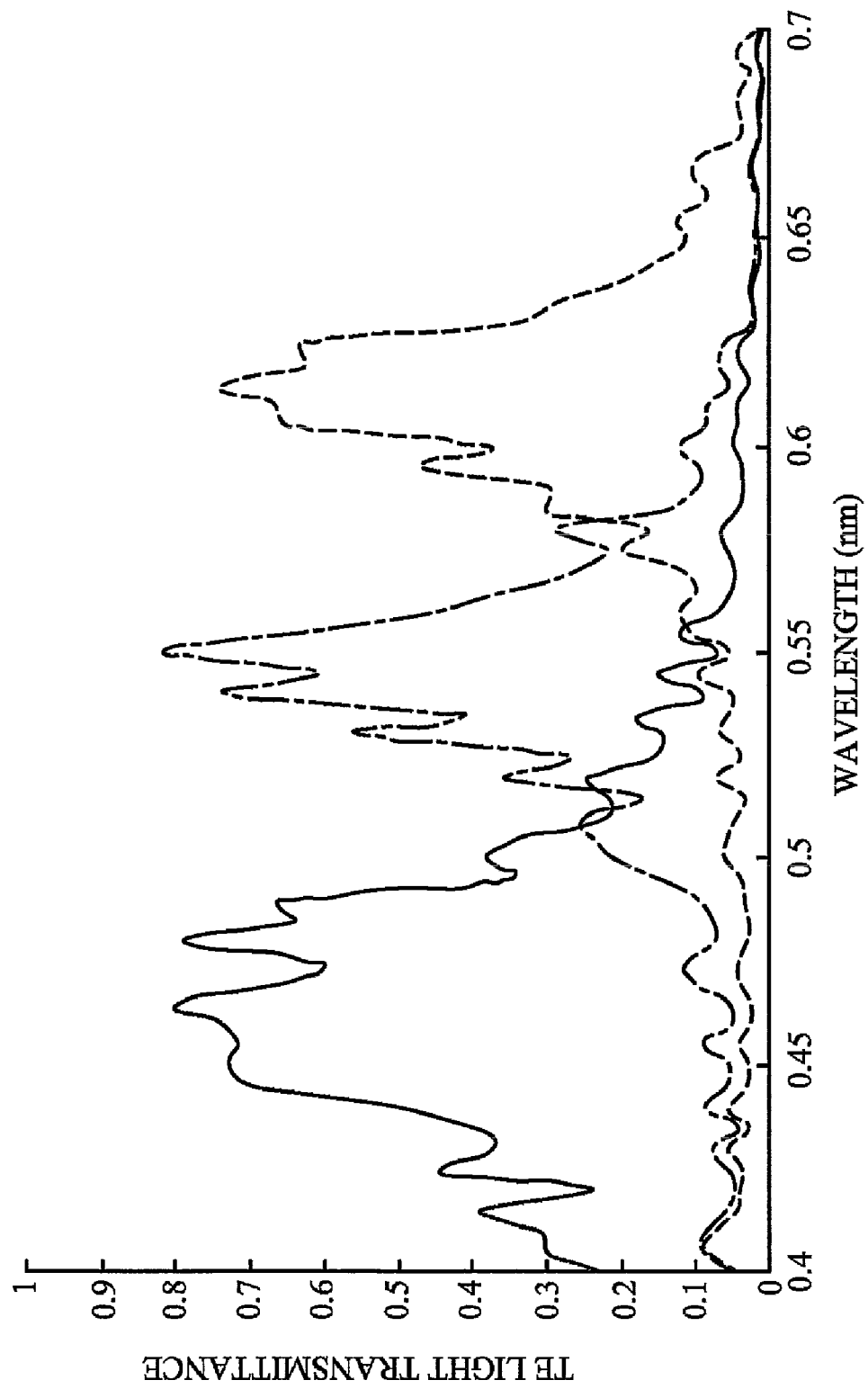
FIG. 11 is a chart showing the TE light transmission spectrum of a color filter.

In addition, optical properties of the color filter of the embodiment are simulated by a commercial application called Gsolver. FIG. 11 is a chart showing the TE light transmission spectrum for the color filter shown in FIG. 10H with an exemplary incident light 10100. The incident light 10100 has a wavelength between 400 and 700 nm, and an incident angle 10110 between the direction of the incident light 10100 and the normal direction 1090 of the substrate 1010. The substrate 1010 has a thickness of 1000 micrometers. One land 1020a and one groove 1020b have a total width 1080 of 200 nm. The lands 1020a have a uniform width 1070 of 100 nm. The first metal layer 1040a and second metal layer 1040b have a uniform thickness 1054, of 50, 60, or 60 nm. The first metal layer 1040a has a relative height 1056 exceeding that of the second metal layer 1040b, of 100, 133, or 160 nm.

As shown in FIG. 11, the TE light transmission peaks occur at 470 (blue), 550 (green), and 610 nm (red), respectively.

In this embodiment, each color light has a TE light transmission over 80% when the width 1080 shifts to 200 nm.

Figure 12A:
FIGS. 12A to 12G are cross-sections of an embodiment of a method for fabricating a color filter.

In FIG. 12A, a substrate 1210, such as a glass substrate, with a polymer layer 1220 thereon is provided. The polymer layer 1220 may be polymethyl methacrylate (PMMA).

Figure 12B:
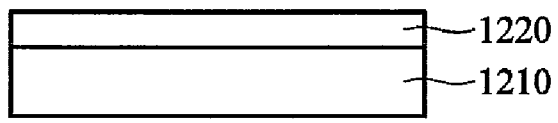

In FIGS. 12A to 12B, a mold 1230 having a pattern of microstructure is pressed into the polymer layer 1220 and the polymer layer 1220 is heated above a glass transition temperature thereof, thereby transferring the pattern to the polymer layer 1220.

Figure 12C:
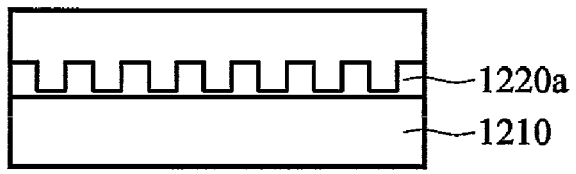

After removal of the mold 1230, a plurality of lands 1220a and grooves 1220b are formed in the polymer layer 1220, as shown in FIG. 12C.

Figure 12D:
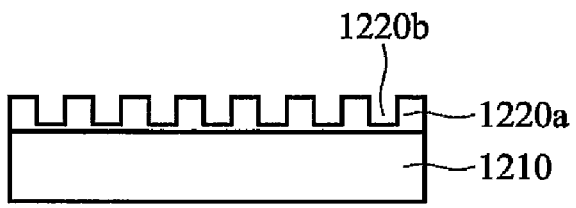

In FIG. 12D, reactive ion etching removes residual portions of the polymer layer 1220 from the bottom of the grooves 1220b, thereby exposing surfaces of the substrate 1210.

Figure 12E:
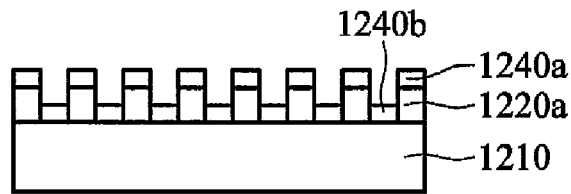

In FIG. 12E, a first metal layer 1240a and second metal layer 1240b are concurrently formed on the lands 1220a and grooves 1220b, respectively, using sputtering or vacuum deposition. The first metal layer 1240a and second metal layer 1240b may be silver (Ag).

Figure 12F:
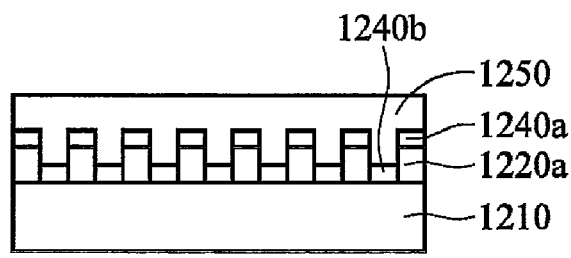

In FIG. 12F, a dielectric layer 1250 is formed on the first metal layer 1240a and second metal layer 1240b.

Figure 12G:
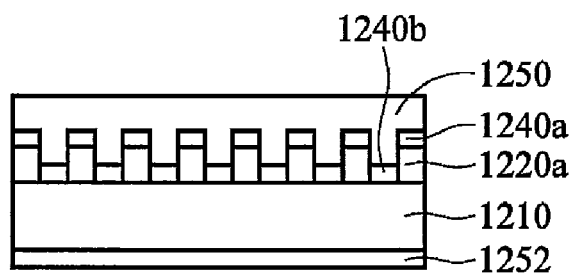
Figure 12H:
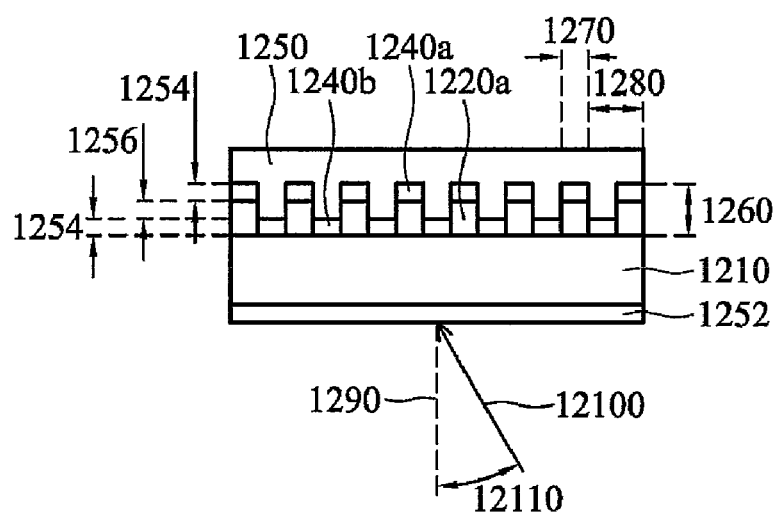
FIG. 12H is a cross-section of an embodiment of a color filter.

In FIG. 12G, a polarizer 1252 is disposed under the substrate 1210.

Figure 13:
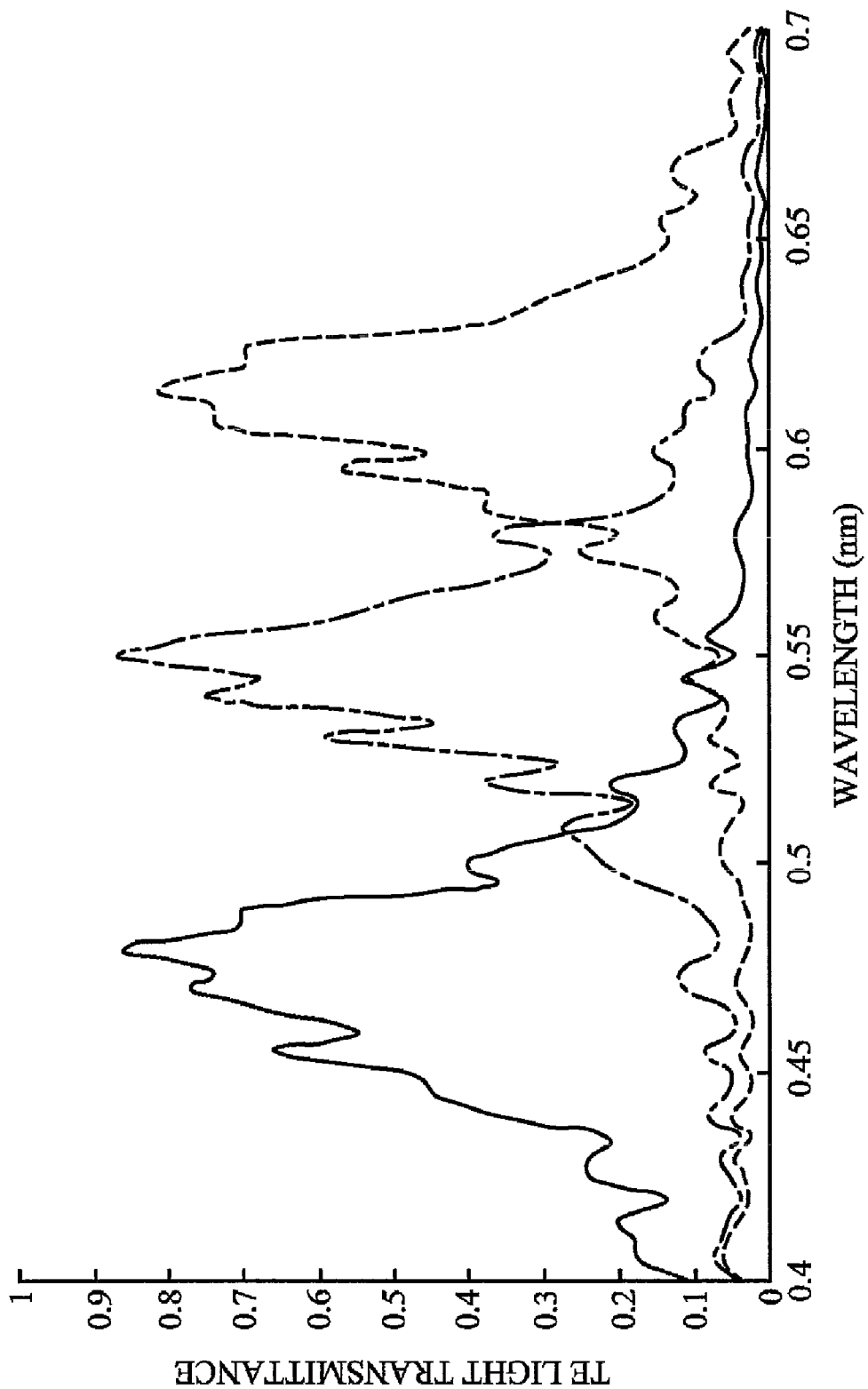
FIG. 13 is a chart showing the TE light transmission spectrum of a color filter.

In addition, optical properties of the color filter of the embodiment are simulated by a commercial application called Gsolver. FIG. 13 is a chart showing the TE light transmission spectrum for the color filter shown in FIG. 12H with an exemplary incident light 12100. The incident light 12100 has a wavelength between 400 and 700 nm, and an incident angle 12110 between the direction of the incident light 12100 and the normal direction 1290 of the substrate 410. The substrate 1210 has a thickness of 1200 micrometers. One land 1220a and one groove 1220b have a total width 1280 of 150 nm. The lands 1220a have a uniform width 1270 of 75 nm. The first metal layer 1240a and second metal layer 1240b have a uniform thickness 1254, of 50, 50, or 50 nm. The first metal layer 1240a has a relative height 1256 exceeding that of the second metal layer 1240b, of 100, 140, or 165 nm.

As shown in FIG. 13, the TE light transmission peaks occur at 470 (blue), 550 (green), 610 nm (red), respectively.

In this embodiment, each color light has a TE light transmission approaching 90% when the width 1280 shifts to 150 nm.

In other embodiments, the second metal layer may be directly formed on the residual polymer layer in the grooves without etching.

Referring to FIG. 12, the color filter of the described embodiments comprises a substrate 1252, a polymer layer having a plurality of lands 1220a and grooves 1220b, a first metal layer 1240a disposed on the lands 1220a, a second metal layer 1240b disposed on the grooves 1220b or a polarizer 1252.

Figure 14A:
FIGS. 14A to 14G are cross-sections of an embodiment of a method for fabricating a color filter.

In FIG. 14A, a substrate 1410, such as a glass substrate, with a polymer layer 1420 formed thereon is provided. The polymer layer 1420 may be mr-L6000.3XP manufactured by micro resist technology Inc.

Figure 14B:
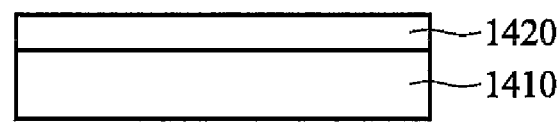

In FIGS. 14A to 14B, a mold 1430 having a pattern of microstructure is pressed into the polymer layer 1420 and the polymer layer 1420 is exposed under UV light, thereby transferring the pattern to the polymer layer 1420.

Figure 14C:
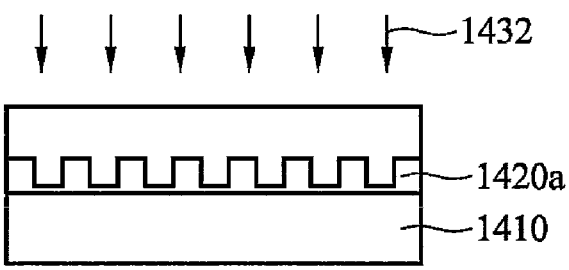

After removal of the mold 1430, a plurality of lands 1420a and grooves 1420b are formed in the polymer layer 1420, as shown in FIG. 14C.

Figure 14D:
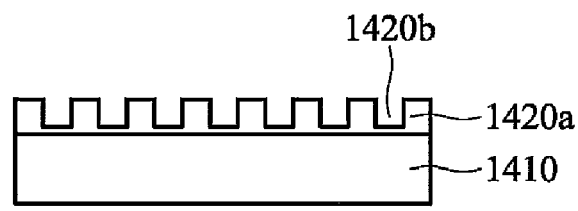

In FIG. 14D, reactive ion etching removes residual portions of the polymer layer 1420 from the bottom of the grooves 1420b, thereby exposing surfaces of the substrate 1410.

Figure 14E:
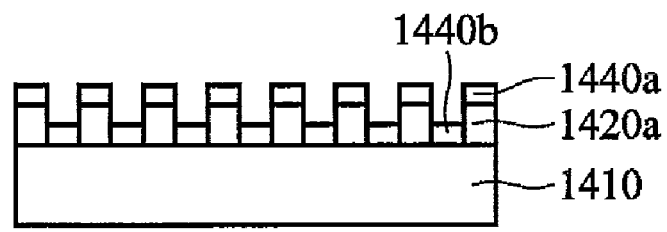

In FIG. 14E, a first metal layer 1440a and second metal layer 1440b are concurrently formed on the lands 1420a and grooves 1420b, respectively, using sputtering or vacuum deposition.

Figure 14F:
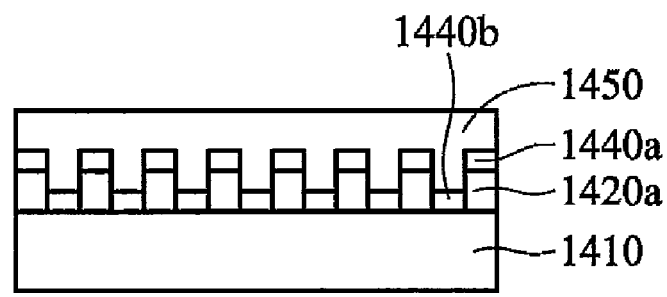

In FIG. 14F, a dielectric layer 1450 is formed on the first metal layer 1440a and second metal layer 1440b.

Figure 14G:
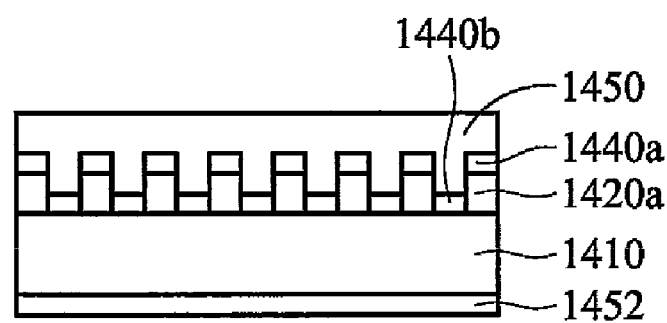

In FIG. 14G, a polarizer 1452 is disposed under the substrate 1410.

In other embodiments, the second metal layer 1440b may be directly formed on the residual polymer layer in the grooves without etching.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A method of fabricating a color filter, the color filter comprising a substrate; a polymer layer disposed on the substrate, having a plurality of lands and grooves; a first metal layer disposed on the lands; and a second metal layer disposed on the grooves, wherein the color filter is transmissive and can generate polarized light with polarized light transmission of red light, green light and blue light at a peak wavelength over 70%, the method comprising:
providing the substrate;
forming the polymer layer on the substrate;
forming the plurality of grooves and lands in the polymer layer;
forming the first metal layer on the lands; and
forming the second metal layer on the grooves.

2. The method as claimed in claim 1, wherein the substrate comprises glass or plastic.

3. The method as claimed in claim 1, wherein the polymer layer comprises polymethyl methacrylate (PMMA).

4. The method as claimed in claim 1, wherein formation of the grooves and lands comprises: providing a mold having a pattern of microstructure; and transferring the pattern to the polymer layer, thereby the lands and the grooves are formed concurrently therein, wherein the polymer layer is heated above a glass transition temperature thereof.

5. The method as claimed in claim 4, further comprising removal of residual polymer layer from the bottom of the grooves, exposing surfaces of the substrate.

6. The method as claimed in claim 5, wherein removal of the residual polymer layer from the bottom of the grooves comprises reactive ion etching.

7. The method as claimed in claim 1, wherein formation of the first metal layer on the lands and formation of the second metal layer on the grooves comprise sputtering or vacuum deposition.

8. The method as claimed in claim 1, further comprising formation of a dielectric layer on the first metal layer and the second metal layer.

9. The method as claimed in claim 1, wherein the polymer layer comprises a photosensitive polymer material.

10. The method as claimed in claim 1, wherein the step of forming the grooves and the lands in the polymer layer comprises: providing a mask having a pattern of microstructure; and transferring the pattern to the polymer layer, thereby the lands and the grooves are formed concurrently therein, wherein the polymer layer is heated above a glass transition temperature thereof.

11. The method as claimed in claim 10, further comprising removal of residual polymer layer from the bottom of the grooves, exposing surfaces of the substrate.

12. The method as claimed in claim 11, wherein removal of residual polymer layer from the bottom of the grooves comprises reactive ion etching.

13. The method as claimed in claim 1, wherein the color filter has polarized light transmission of the red light, the green light and the blue light at the peak wavelength over 80%.

14. The method as claimed in claim 1, wherein the polarized light is TE light.

15. A color filter, comprising:
a substrate;
a polymer layer disposed on the substrate, having a plurality of lands and grooves;
a first metal layer disposed on the lands; and
a second metal layer disposed on the grooves, wherein the color filter is transmissive and can generate polarized light with polarized light transmission of red light, green light and blue light at a peak wavelength over 70%.

16. The color filter as claimed in claim 15, further comprising a polarizer disposed over the substrate.

17. The color filter as claimed in claim 15, further comprising a polarizer, wherein the substrate has a first surface and a second surface opposite to the first surface, the second metal layer is disposed on the grooves and in contact with the first surface of the substrate, and the polarizer is disposed on and in contact with the second surface of the substrate.

18. The color filter as claimed in claim 15, wherein one land and one groove have a total width between 50 and 400 nm.

19. The color filter as claimed in claim 15, wherein the lands and the grooves have a ratio of width between 0.25 and 0.75.

20. The color filter as claimed in claim 15, wherein the first metal layer has a relative height exceeding that of the second metal layer, over 20 nm.

21. The color filter as claimed in claim 15, wherein the first metal layer and the second metal layer have a difference in thickness less than 10%.

22. The color filter as claimed in claim 15, wherein the substrate comprises glass or plastic.

23. The color filter as claimed in claim 15, wherein the polymer layer comprises polymethyl methacrylate (PMMA).

24. The color filter as claimed in claim 15, wherein the polymer layer comprises a photosensitive polymer material.

25. The color filter as claimed in claim 15, wherein the metal layer comprises Au, Ag, Al, or Pt.

26. The color filter as claimed in claim 15, further comprising a dielectric layer disposed on the first metal layer and the second metal layer.

27. The color filter as claimed in claim 15, wherein the color filter has polarized light transmission of the red light, the green light and the blue light at the peak wavelength over 80%.

28. The color filter as claimed in claim 15, wherein the polarized light is TE light.

* * * * *